April 18, 1950          D. I. PUGIN          2,504,582
SPEED INDICATING DEVICE
Filed Sept. 9, 1947
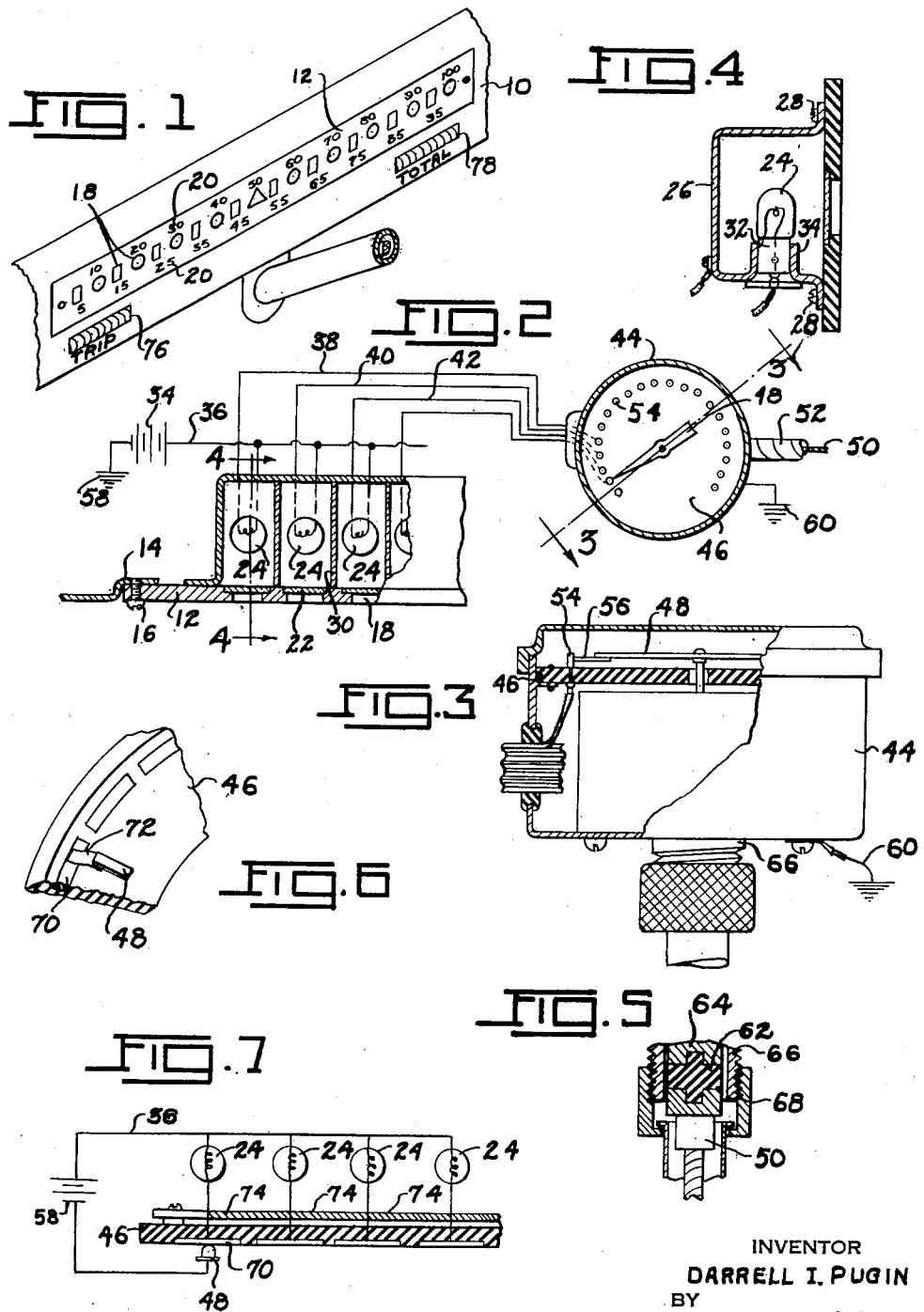
INVENTOR
DARRELL I. PUGIN
BY
Toulmin & Toulmin
ATTORNEYS Patented Apr. 18, 1950

2,504,582

UNITED STATES PATENT OFFICE 2,504,582

SPEED INDICATING DEVICE

Darrell I. Pugin, Springfield, Ohio

Application September 9, 1947, Serial No. 773,034

2 Claims. (Cl. 177—311.5)

This invention relates to speed indicating devices such as speedometers for automotive vehicles, and particularly to illuminated speed indicating devices.

In the usual speedometer there is a dial which is calibrated, usually in miles per hour, and over which a pointer sweeps for indicating the speed at which the vehicle is traveling. In an arrangement of this type it is necessary to observe the face of the instrument directly in order to determine the speed at which the vehicle is traveling and this detracts from the attention which the driver can give to the road and surrounding traffic. In some cases, when the illumination is low, it is difficult to read an instrument of this type quickly. Accordingly there is a certain hazard attended with the usual type speedometer mechanism, and especially at higher car speeds.

The primary object of the present invention is to provide for a speedometer mechanism which is very easy to read and by which the speed of the vehicle can be determined at any time by a quick glance at the instrument.

Another object is to provide for a speedometer mechanism for vehicles in which the indicia of the instrument are illuminated in order to indicate the vehicle speed.

Still a further object of this invention is to provide a speedometer arrangement, including illuminated indicia which can be adapted to any scheme of design which the vehicle may take.

These and other objects and advantages will become more apparent upon reference to the following description taken in connection with the accompanying drawings in which:

Figure 1 is a perspective view showing a fragment of an automobile dashboard having an instrument according to this invention mounted therein;

Figure 2 is a more or less diagrammatic view showing a portion of the instrument and the electrical connections therewith by which the indicia are illuminated;

Figure 3 is a section through the speed responsive portion of the device of this invention and shows the manner of making contact with the indicia illuminating means;

Figure 4 is a vertical section through the panel mounted part of the instrument and is indicated by the line 4—4 on Figure 2;

Figure 5 is a fragmentary view showing a manner of insulating the speedometer from the speedometer cable and cable housing when it is desired to do so;

Figure 6 is a fragmentary view showing another manner of setting the contacts in the dial of the speed responsive part of the instrument of this invention; and Figure 7 is a diagrammatic view showing modified construction wherein all of the indicia are maintained illuminated all the time.

Referring to the drawings, Figure 1 shows a fragment of a panel 10 of an automotive vehicle and in which is mounted a panel 12. The panel 12 may be secured in position by aperturing the part 10, and providing a recessed lip as at 14 in Figure 2 which abuts the rear edge of panel 12. The screws 16 may be employed for securing the panel to the lips 14 thereby firmly to retain the panel 12 in position. The panel 12 is provided along its length with a plurality of spaced apertures as at 18 which represent the speeds which the mechanism is to indicate. The apertures may be provided with numerals placed above or below as indicated at 20 in Figure 1, or may, as seen in Figure 2 be provided with windows as at 22 which have stamped or imprinted thereon the proper numerals.

For convenience in reading the instrument, I prefer that the apertures 18 which indicate the odd multiples of five be one shape while the apertures indicating the even multiples of 5 be another shape. Further distinguishing features may be provided by variously shaping the apertures in order to indicate certain predetermined speeds. In the arrangements shown the apertures which represent the odd multiples of five are rectangular, while the apertures representing even multiples of five are circular. To distinguish the aperture which indicates fifty miles per hour it is formed to a triangular shape. It will be understood that the windows 22 for the apertures could be variously colored if desired in order to provide a further means for readily determining the speed being indicated by the instrument.

In Figure 2 it will be seen that each of the apertures 18 has associated therewith a light bulb 24 which is carried behind its associated aperture by a frame 26 which may be secured to the rear face of the panel 12 by the screws 28. Positioned between each pair of bulbs 24 is a light impervious baffle member 30 so that the illumination from each lamp is directed only to one aperture. As shown, the bulbs 24 may have a bayonet type base as at 32 receivable in a socket 34 of the member 26.

Each of the bulbs 24 has one terminal thereof connected with one side of a battery 34 as by means of the conductor 36. Each of the bulbs has its other side connected by an individual wire, as at 38, 40, 42 to the speed responsive mechanism indicated at 44.

The mechanism at 44 may be of any of the usual types of speed responsive mechanisms which constitute a dial 46 and a pointer 48 adapted for sweeping over the said dial to occupy a position indicative of the speed of the vehicle. The connection of the mechanism 44 with the running gear of the vehicle is accomplished by means of the cable 50 which is secured to the said mechanism by means of a cable housing 52.

As will be best seen in Figure 3, the dial 46 of the speed responsive mechanism 44 is a plate of electrical insulating material and mounted therein are a plurality of studs 54. The studs 54 are electrically conductive and each thereof is connected with a different one of the wires 38, 40, 42 and so on so that each of the studs is connected in circuit with one of the bulbs 24.

The pointer 48 of the speed responsive mechanism 44 is also electrically conductive and carries at its tip a contact member 56 which may be spring steel, Phosphor bronze or the like and which is adjusted in order to engage the studs with as little pressure as possible. The contacting of the studs by the contact member 56 therefor does not operate to influence the position which the pointer 48 will occupy.

The side of the battery 34 opposite the wire 36 is grounded at 58 and the casing of the speed responsive mechanism is grounded at 60. Thus, each time the contact member 56 engages one of the studs 54, one of the bulbs 24 will become illuminated and illuminate one of the apertures 18.

In the event that it is desired to make the electrical connections to the speed responsive mechanism and to the panel mounted part of the instrument in a different manner, the speed responsive mechanism may be insulated from the other portions of the frame of the vehicle by a suitable insulating means while the speedometer cable and the cable housing are insulated from the said mechanism by means of the block of insulating material 62 which is placed between the end of the cable 50 and the spindle 64 by the speed responsive mechanism, while the cable housing is insulated from the nipple 66 at the back of the said mechanism by means of the layer of insulating material as at 68. The material at 68 comprises a sprayed on or painted on coating or may be a bushing which is threaded on the nipple before the cable nut is placed in position.

In the event that it is desirable to reduce the length of time between the breaking of the circuit to one of the bulbs 24 and the making of another, the studs 54 may be formed as shown in Figure 6 wherein these contact members are in the form of elongated plates 70 which are set in the face of the dial 46. The contact member on the end of the pointer 48 is then shaped to be resilient at right angles to the plane of the dial 46 and bears on the contact member 70 as indicated at 72. The arrangement shown in Figure 6 would provide for substantially continuous illumination of at least one of the indicia of the indicating portion of the mechanism.

In certain instances, and especially for night driving, it may be desirable to provide for a continuous illumination of all of the indicating part of the instrument at all times. To this end, the arrangement shown in Figure 7 may be employed wherein the light bulbs 24 have their terminals opposite the conductor 36 connected together by the resisters shown at 74. Each of the said bulbs has the same side thereof directly connected with one of the contact members 70 in the dial 46. The arrangement in Figure 7 is such that at any time there will be one, and only one, of the bulbs 24 illuminated to full brilliance while the others thereof will be illuminated substantially less than full brilliance, the exact amount being inversely proportionate to the distance that pointer 48 is away from the associated contact members 70. By the arrangement shown in Figure 7, assuming the vehicle to be traveling forty miles per hour, the indicia marked 40 will be illuminated to full brilliance while extending either way from this indicia the other indicia device will be illuminated to an ever decreasing brilliance. Accordingly, while the whole of the indicating part of the device is illuminated by the circuit shown in Figure 7 it is readily determinable what the speed of the vehicle is merely by observing where across the instrument the point of maximum brilliance occurs.

It will be evident from the foregoing that a speedy indicating mechanism according to this invention provides for an instrument which is very easily and quickly read at any time and which can be arranged in any of several manners in order to conform with the styling of the vehicle which is being used. It will also be apparent that the arrangement shown is not the only arrangement that this invention can take. For example, the illuminated indicia, rather than comprising numbered apertures, could be formed of other light conductive media such as plastic or glass and behind which the light source could be positioned in a suitable manner.

If desirable to provide a visible indication of the trip mileage or total mileage of the vehicle, as in the case of the usual speedometer, these indicating members could be mounted as shown at 76 and 78 in Figure 1. Since they are disassociated from the indicating part of the mechanism they could be arranged in a convenient or desirable location.

It will be understood that this invention is susceptible to modification in order to adopt it to different usages and conditions and, accordingly, it is desired to comprehend such modifications within this invention as may fall within the scope of the appended claims.

I claim:

1. In combination; a speedometer having a dial of electrical insulating material, a pointer movable across said dial, a plurality of contacts carried in said dial, and a resilient contact element carried by said pointer and adapted to engage said contacts in succession as said pointer sweeps said dial; a panel having a plurality of spaced indicia; a light bulb mounted behind each said indicia; and an electric circuit connecting each said bulb with one of said contacts and including a battery whereby said bulbs are successively illuminated as said pointer sweeps said dial, and resister means connecting said contacts whereby the bulbs not associated with the contact being engaged by said pointer will burn at reduced brilliance.

2. In combination; a speedometer having a dial of electrical insulating material, a pointer movable across said dial, a plurality of contacts carried in said dial, and a resilient contact element carried by said pointer and adapted to engage said contacts in succession as said pointer sweeps said dial; a panel having a plurality of spaced indicia; a light bulb mounted behind each said indicia; and an electric circuit connecting each said bulb with one of said contacts and including a battery whereby said bulbs are successively illuminated as said pointer sweeps said dial, resister means connecting said contacts whereby the bulbs not associated with the contact being engaged by said pointer will burn at reduced brilliance and baffle means between said bulbs for preventing each thereof from directly illuminating more than one indicia.

DARRELL I. PUGIN.

REFERENCES CITED

The following references are of record in the file of this patent:

UNITED STATES PATENTS

| Number | Name | Date |
|---|---|---|
| 1,042,316 | Cantrall | Jan. 21, 1911 |
| 1,310,778 | Blakemore | July 22, 1919 |
| 1,420,314 | Haslett | June 20, 1922 |
| 2,228,835 | Leppert | Jan. 14, 1941 |

FOREIGN PATENTS

| Number | Country | Date |
|---|---|---|
| 280,117 | Great Britain | Nov. 10, 1927 |